United States Patent
Nomura et al.

(10) Patent No.: US 12,163,313 B2
(45) Date of Patent: Dec. 10, 2024

(54) WORK VEHICLE CONTROL DEVICE AND WORK VEHICLE

(71) Applicant: Komatsu Ltd., Tokyo (JP)

(72) Inventors: Makoto Nomura, Tokyo (JP); Takanori Yamane, Tokyo (JP)

(73) Assignee: Komatsu Ltd., Tokyo (JP)

( * ) Notice: Subject to any disclaimer, the term of this patent is extended or adjusted under 35 U.S.C. 154(b) by 644 days.

(21) Appl. No.: 17/292,127

(22) PCT Filed: Feb. 25, 2020

(86) PCT No.: PCT/JP2020/007525
§ 371 (c)(1),
(2) Date: May 7, 2021

(87) PCT Pub. No.: WO2020/179548
PCT Pub. Date: Sep. 10, 2020

(65) Prior Publication Data
US 2021/0395976 A1 Dec. 23, 2021

(30) Foreign Application Priority Data

Mar. 4, 2019 (JP) .................... 2019-039025

(51) Int. Cl.
*E02F 9/20* (2006.01)
*E02F 3/32* (2006.01)
(Continued)

(52) U.S. Cl.
CPC .............. *E02F 9/207* (2013.01); *E02F 3/325* (2013.01); *E02F 9/2285* (2013.01); *H02P 27/06* (2013.01)

(58) Field of Classification Search
CPC ......... E02F 9/207; E02F 3/325; E02F 9/2285; E02F 9/2058; E02F 9/226; E02F 9/24;
(Continued)

(56) References Cited

U.S. PATENT DOCUMENTS

2012/0205171 A1* 8/2012 Takishita ............... B60K 25/02
180/68.1
2013/0197766 A1* 8/2013 Kurikuma ............. E02F 9/2246
701/50
(Continued)

FOREIGN PATENT DOCUMENTS

CN 1834672 A 9/2006
CN 103299005 A 9/2013
(Continued)

*Primary Examiner* — Anne Marie Antonucci
*Assistant Examiner* — Misa H Nguyen
(74) *Attorney, Agent, or Firm* — Locke Lord LLP

(57) ABSTRACT

A control device of a work vehicle is provided with: a start operation determination unit that determines whether or not a generation state exists in which a start signal of a start switch for starting an electric motor has been generated; a lock state determination unit that determines whether or not a safe operation unit is in a lock state; a circuit state determination unit that determines whether or not a supply circuit is in a state of being capable of supplying power to the electric motor; and a drive instruction unit that, in the generation state and the lock state, outputs a drive instruction to the electric motor when the supply circuit transitions from a state of being incapable of supplying the power to a supply-capable state.

6 Claims, 6 Drawing Sheets

(51) Int. Cl.
*E02F 9/22* (2006.01)
*H02P 27/06* (2006.01)

(58) Field of Classification Search
CPC . H02P 27/06; H02P 1/16; H02P 29/00; Y02T 10/70
See application file for complete search history.

(56) References Cited

U.S. PATENT DOCUMENTS

| | | |
|---|---|---|
| 2013/0318956 A1 | 12/2013 | Yunoue et al. |
| 2015/0300384 A1 | 10/2015 | Zhang et al. |
| 2019/0056771 A1 | 2/2019 | Sato |

FOREIGN PATENT DOCUMENTS

| | | |
|---|---|---|
| CN | 103991386 A | 8/2014 |
| JP | H09-105136 A | 4/1997 |
| JP | 2015-101840 A | 6/2015 |
| JP | 2016-196759 A | 11/2016 |
| KR | 20140009279 A | 1/2014 |
| WO | 2012/114794 A1 | 8/2012 |

* cited by examiner

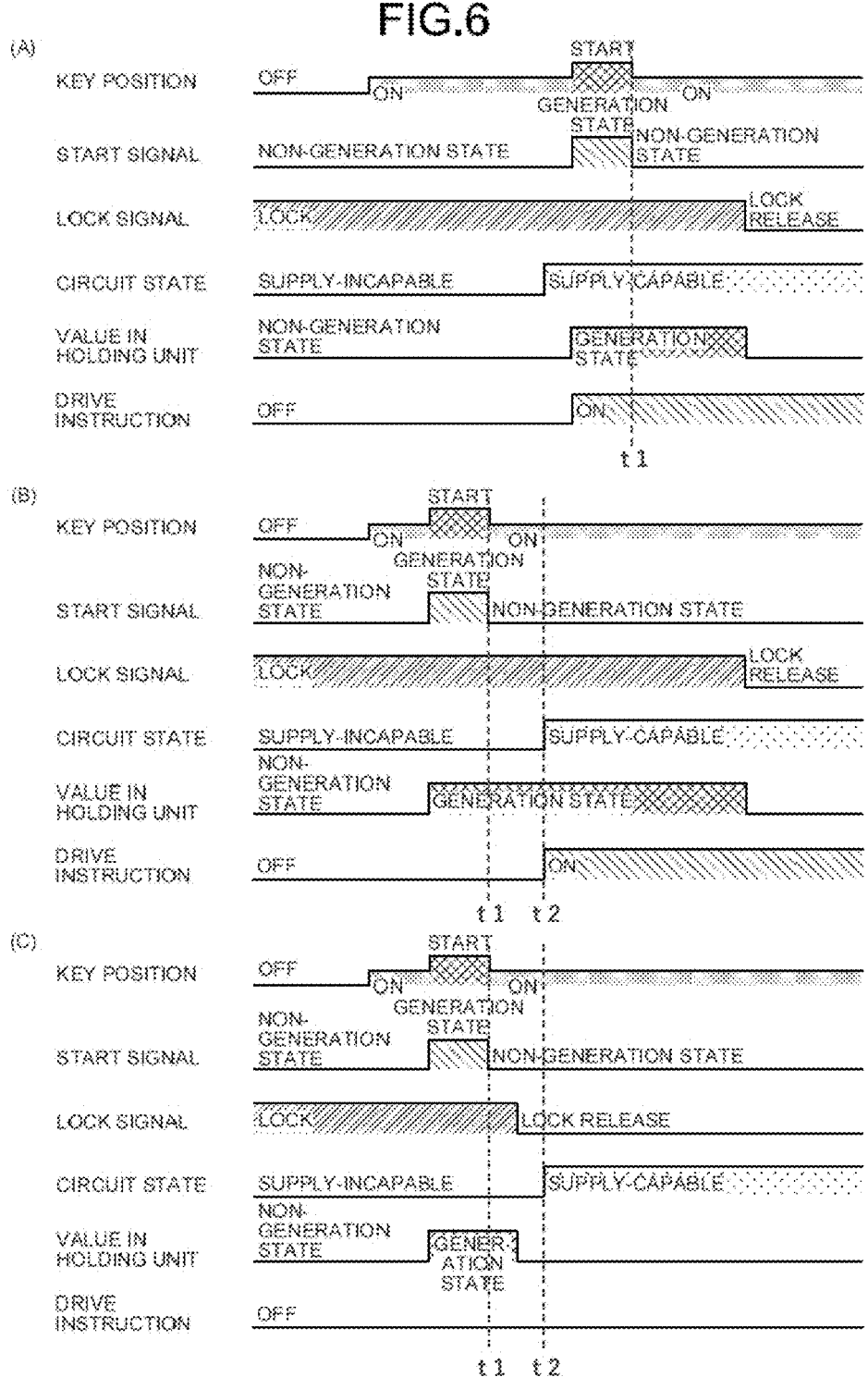

WORK VEHICLE CONTROL DEVICE AND WORK VEHICLE

FIELD

The present invention relates to a work vehicle control device and a work vehicle.

BACKGROUND

As disclosed in Patent Literature 1, excavators that are provided with a startup switch to control the energization/non-energization of electrical equipment and the starting/stopping of the engine are known. The startup switch is capable of changing to a key OFF state, a key ON state, and a start state, respectively. When the startup switch is in a key OFF state, the electrical equipment is in a non-energized state and does not start. When the startup switch changes from a key OFF state to a key ON state through operation by an operator, the electrical equipment enters an energized state and starts up. When the startup switch changes from a key ON state to a start state through operation by the operator, the engine starts.

CITATION LIST

Patent Literature

Patent Literature 1: JP 2016-196759 A

SUMMARY

Technical Problem

Sometimes a single step operation is carried out in which the startup switch is changed at once from a key OFF state to a start state. When the prime mover of the excavator is an engine, the engine can be started even when a single step operation is carried out. When, on the other hand, the prime mover of the excavator is an electric motor, the electric motor will likely not start when a single step operation is carried out. For example, in a case where power outputted from a drive battery is supplied to the electric motor via a supply circuit, when the startup switch changes from a key OFF state to a key ON state, the supply circuit transitions from a state of being incapable of supplying power to the electric motor to a state of being capable of supplying power. When a single step operation is carried out, the startup switch will likely be returned from a start state to a key ON state before the supply circuit transitions to a state of being capable of supplying power. As a result, even when the supply circuit transitions to a state of being capable of supplying power, because the startup switch startup signal is not supplied to the electric motor, the electric motor does not start.

An object of the embodiment of the present invention is to cause an electric motor to start even when a single step operation is carried out.

Solution to Problem

According to an aspect of the present invention, a control device of a work vehicle, the control device comprises: a start operation determination unit that determines whether or not a generation state exists in which a start signal of a start switch for starting an electric motor has been generated; a lock state determination unit that determines whether or not a safe operation unit is in a lock state; a circuit state determination unit that determines whether or not a supply circuit is in a state of being capable of supplying power to the electric motor; and a drive instruction unit that, in the generation state and the lock state, outputs a drive instruction to the electric motor when the supply circuit transitions from a state of being incapable of supplying the power to a supply-capable state.

Advantageous Effects of Invention

According to an embodiment of the present invention, an electric motor can be started even when a single step operation is carried out.

BRIEF DESCRIPTION OF DRAWINGS

FIG. 6 is a timing chart illustrating drive start processing of the work vehicle according to the present embodiment.

DESCRIPTION OF EMBODIMENTS

Although an embodiment according to the present invention is described hereinbelow, the present invention is not limited thereto. Constituent elements of the embodiments described hereinbelow can, where appropriate, be combined. Moreover, some of the constituent elements may also not be used.

<Overview of Work Vehicle>

Figure 1:
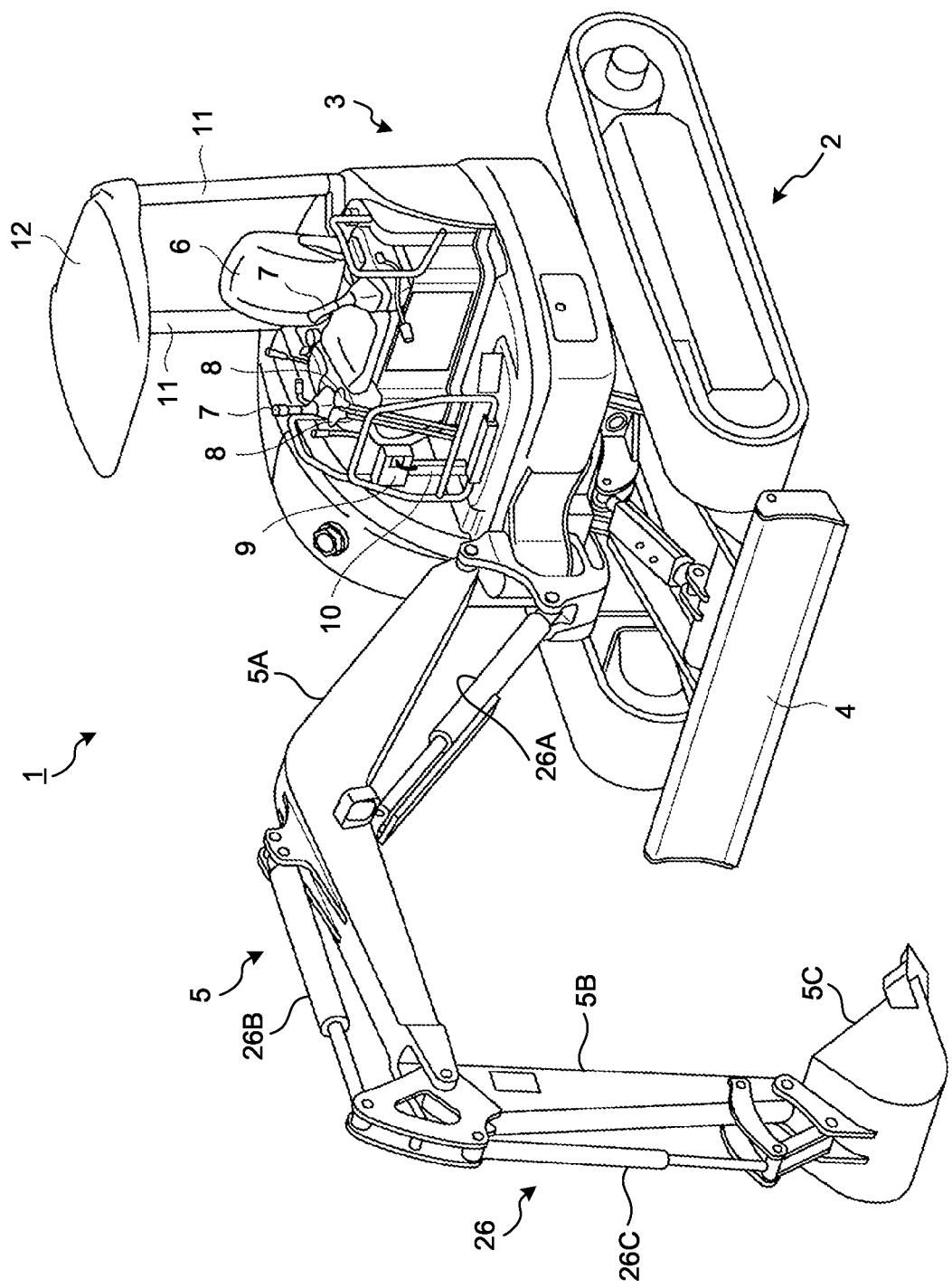
FIG. 1 is a perspective view of a work vehicle according to the present embodiment.

FIG. 1 is a perspective view of a work vehicle 1 according to the present embodiment. In this embodiment, it is assumed that the work vehicle 1 is a compact excavator. In the description hereinbelow, the work vehicle 1 is, where appropriate, referred to as the excavator 1.

The excavator 1 is provided with: a traveling body 2, a swing body 3, a blade 4, and a working equipment 5. The traveling body 2 has a pair of crawler tracks. The swing body 3 swings above the traveling body 2. The blade 4 moves in an up-down direction in front of the traveling body 2. The working equipment 5 is connected to the front of the swing body 3. The working equipment 5 has a boom 5A, an arm 5B, and a bucket 5C. The working equipment 5 is driven by the motive power generated by a working equipment cylinder 26. The working equipment cylinder 26 includes a boom cylinder 26A that drives the boom 5A, an arm cylinder 26B that drives the arm 5B, and a bucket cylinder 26C that drives the bucket 5C. Note that the excavator 1 need not be provided with a blade.

The swing body 3 has an operator seat 6, a working equipment lever 7, a travel lever 8, a display device 9, a support 11, and a canopy 12.

The operator seat 6 is occupied by the operator. The working equipment lever 7 is disposed on the respective left and right sides of the operator seat 6. The travel lever 8 and the display device 9 are disposed in front of the operator seat 6. The display device 9 is supported by a support arm 10. The support arm 10 is fixed to the front of the floor of the swing body 3. The operator is able to operate the working equipment lever 7 and the travel lever 8 while sitting in the operator seat 6. The operator is able to check the display device 9 while sitting in the operator seat 6.

The support 11 is fixed to the rear of the swing body 3. The canopy 12 is supported by the support 11. The canopy 12 is disposed above the operator seat 6. In this embodiment, the excavator 1 is of the canopy type in which the space around the operator seat 6 is open.

Figure 2:
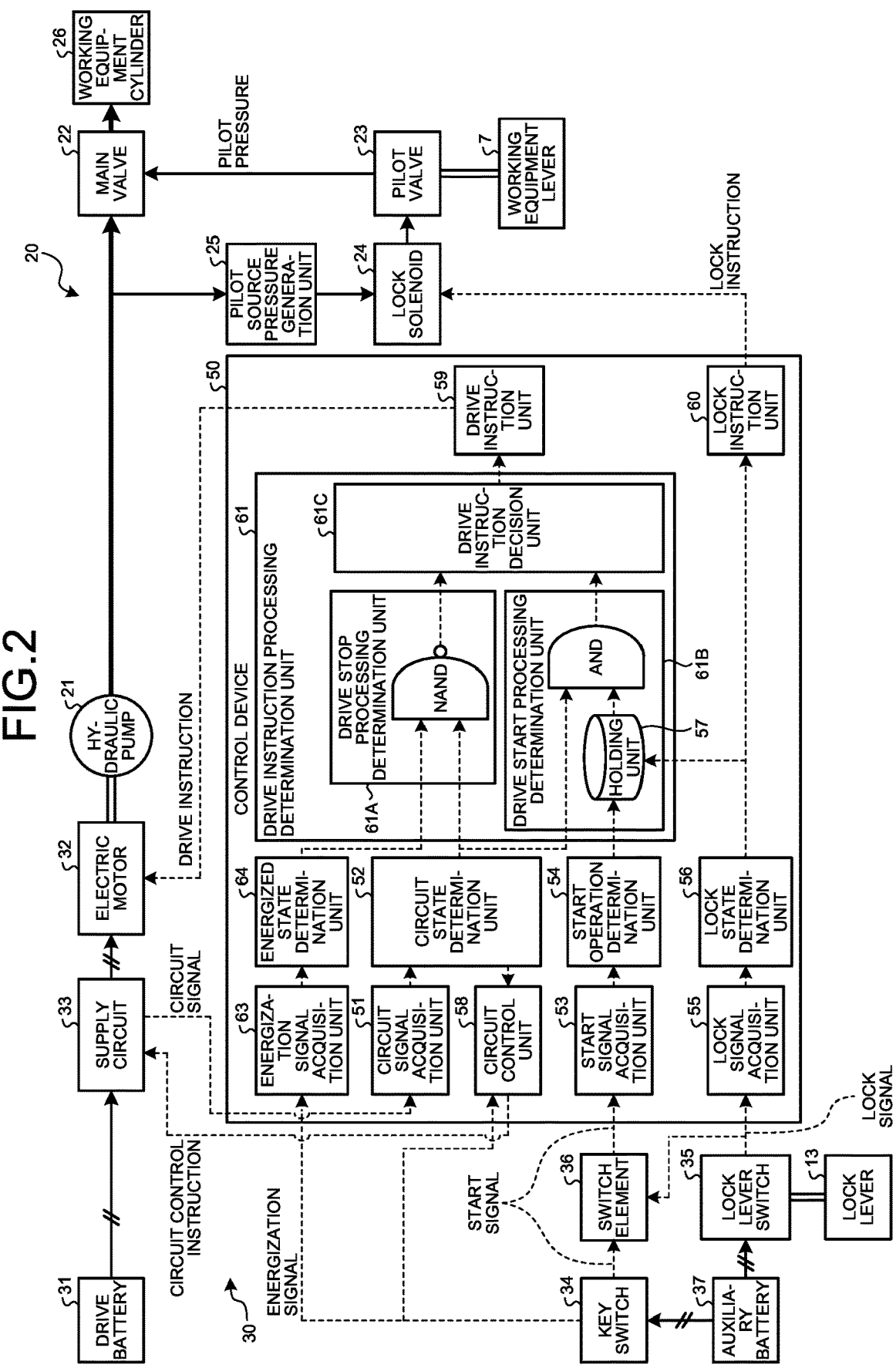
FIG. 2 is a block diagram illustrating the work vehicle according to the present embodiment.

FIG. 2 is a block diagram illustrating the excavator 1 according to the present embodiment. In the present embodiment, the excavator 1 is provided with a hydraulic system 20, an electrical system 30, and a control device 50.

<Hydraulic System>

The hydraulic system 20 drives the working equipment 5. The hydraulic system 20 has a hydraulic pump 21, a main valve 22 connected to the hydraulic pump 21 via a flow channel, and a working equipment cylinder 26 that performs driving on the basis of hydraulic fluid supplied from the hydraulic pump 21. The hydraulic pump 21 discharges hydraulic fluid. The hydraulic pump 21 is a motive power source of the working equipment cylinder 26. The working equipment cylinder 26 is a hydraulic cylinder for driving the working equipment 5. The working equipment cylinder 26 extends and contracts on the basis of the flow rate of the hydraulic fluid. The working equipment 5 is driven through the extension and contraction of the working equipment cylinder 26.

Furthermore, the hydraulic system 20 has a pilot valve 23 that adjusts the pilot pressure for moving the spool of the main valve 22; a lock solenoid 24 that places the working equipment 5 in a non-drivable state by restricting the action of the pilot pressure on the spool, and a pilot source pressure generation unit 25 that generates a pilot source pressure which is supplied to the pilot valve 23. The pilot valve 23 operates on the basis of the operation amount of the working equipment lever 7. When the working equipment lever 7 is operated, the pilot valve 23 operates, the pilot pressure rises, and the spool moves. The hydraulic fluid from the hydraulic pump 21 is supplied to the working equipment cylinder 26 through the movement of the spool. The lock solenoid 24 operates on the basis of a lock instruction which is outputted from the control device 50. When a lock instruction is outputted, the lock solenoid 24 blocks the passage of pilot oil which is supplied from the pilot source pressure generation unit 25 to limit the action of the pilot pressure on the spool. The working equipment 5 enters a non-drivable state as a result of the passage of the pilot oil being blocked. Hydraulic fluid supplied from the hydraulic pump 21 is supplied to the pilot source pressure generation unit 25.

<Electrical System>

The electrical system 30 has a drive battery 31, an electric motor 32, a supply circuit 33, a key switch 34, a lock lever switch 35, a switch element 36, and an auxiliary battery 37.

The drive battery 31 is a storage battery which is a rechargeable power storage device such as a battery, for example. The drive battery 31 is an energy source that supplies power to the electric motor 32 via the supply circuit 33. The excavator 1 is a battery-type excavator that performs driving on the basis of power supplied from the drive battery 31.

The electric motor 32, which is a prime mover, uses the power supplied from the drive battery 31 to generate motive power for driving the hydraulic pump 21. The hydraulic pump 21 is connected to the output shaft of the electric motor 32.

The supply circuit 33 supplies the power outputted from the drive battery 31 to the electric motor 32. The supply circuit 33 is disposed between the drive battery 31 and the electric motor 32. The power outputted from the drive battery 31 is supplied to the electric motor 32 via the supply circuit 33.

The key switch 34 is operated by the operator. The key switch 34 is a start switch for starting the electric motor 32. When starting the electric motor 32, the operator inserts a key into the key cylinder of the key switch 34 and turns the key.

The key switch 34 is capable of changing to a key OFF state, a key ON state, and a start state, respectively. When the key is turned by the operator while inserted in the key cylinder, the key switch 34 rotates to any of "OFF", "ON", and "start" positions. When the key is rotated to the "OFF" position, the key switch 34 enters a key OFF state. When the key is rotated to the "ON" position, the key switch 34 enters a key ON state. When the key is rotated to the "start" position, the key switch 34 enters a start state. The key switch 34 generates a start signal for starting the electric motor 32 in a start state.

At such time, when the operator removes their hand from the key switch 34, the key switch 34 returns from the "start" position to the "on" position. In either a key ON state or a start state, the key switch 34 generates an energization signal. In a key OFF state, the key switch 34 does not generate the energization signal.

The lock lever switch 35 outputs a lock signal for operating the lock solenoid 24 on the basis of the operating state of a lock lever 13. The lock lever 13 is operated to place the working equipment 5 in a non-drivable state. The lock lever 13 is disposed next to the operator seat 6, for example, and is operated by the operator. The lock lever 13 is capable of moving from one of a lock position and a release position to the other position. When the lock lever 13 is moved to the lock position, the lock lever switch 35 outputs a lock signal to the control device 50 and the switch element 36. The control device 50 outputs a lock instruction to the lock solenoid 24 on the basis of the lock signal. The working equipment 5 enters a non-drivable state as a result of a lock instruction being outputted from the control device 50 to the lock solenoid 24. When the lock lever 13 is moved to the release position, the lock instruction is not outputted from the control device 50 to the lock solenoid 24 and the working equipment 5 enters a drivable state. The lock lever 13 is an example of a safe operation unit.

In the description hereinbelow, a state where the lock lever 13 of the working equipment 5 is disposed in the lock position and where the working equipment 5 is in a non-drivable state is, where appropriate, referred to as a lock state, and a state where the lock lever 13 of the working equipment 5 is disposed in the release position and where the working equipment 5 is in a drivable state is, where appropriate, referred to as a lock release state.

Upon sitting in the operator seat 6 and starting the electric motor 32, the operator first places the lock lever 13 in a lock state. As a result of the lock lever 13 entering a lock state, the lock lever switch 35 generates a lock signal for placing the working equipment 5 in a non-drivable state. The lock signal generated by the lock lever switch 35 indicates that the lock lever 13 is in a lock state.

In a state where the lock lever 13 is in a lock state, when the operator operates the key switch 34 to the "start" position so as to start the electric motor 32, the electric motor 32 is capable of starting.

When the lock lever 13 is in a lock release state, the electric motor 32 is not capable of starting. The operator operates the key switch 34 in a state where the lock lever 13 is in a lock state, thereby causing the electric motor 32 to start. After the electric motor 32 has started, the operator places the lock lever 13 in a lock release state. The working equipment 5 accordingly enters a drivable state.

The switch element 36 switches between supplying the start signal to the control device 50 and blocking the start signal. The switch element 36 acquires the lock signal from the lock lever switch 35. In a state where the switch element 36 is in an ON state, the start signal generated in the key switch 34 is supplied to the control device 50. In a state where the switch element 36 is in an OFF state, the start signal is not supplied to the control device 50.

The switch element 36 includes a lever, for example. When the lock lever 13 is in a lock state, the lock lever switch 35 outputs a lock signal to the switch element 36. When the lock signal is outputted to the switch element 36, the switch element 36 enters an ON state. When the lock signal is not outputted to the switch element 36, the switch element 36 enters an OFF state.

In other words, when the lock lever 13 is in a lock state and the lock signal is outputted to the switch element 36, the start signal of the key switch 34 is outputted to the control device 50. When the lock lever 13 is in a lock release state and the lock signal is not outputted to the switch element 36, the start signal of the key switch 34 is not outputted to the control device 50, and the electric motor 32 is incapable of starting.

Because the electric motor 32 is capable of starting only when the lock lever 13 is in a lock state, even when the operator inadvertently operates the working equipment lever 7 as is, it is possible to prevent unintentional operation of the working equipment cylinder 26 at the same time as starting the electric motor 32.

The auxiliary battery 37 supplies power to electrical equipment that is installed in the excavator 1 and includes the key switch 34 and the lock lever switch 35. The auxiliary battery 37 is a battery which is separate from the drive battery 31. The auxiliary battery 37 is a 12 V or 24 V battery of a lower voltage than the drive battery 31. Other examples of the electrical equipment include sensors for detecting the temperature of a horn, a work light, and a charger, which are not illustrated; a water pump for cooling the charger; and a cooling fan for cooling liquid that cools the charger.

When the key switch 34 is in a key OFF state, the electrical equipment installed in the excavator 1 does not start up, and the electric motor 32 does not start. In a state where the key switch 34 is in a key ON state or a start state, power is supplied to the electrical equipment via a power supply line (not illustrated), and the electrical equipment does not start up. When the key switch 34 changes from a key ON state to a start state, a start signal for starting the electric motor 32 is outputted from the key switch 34.

<Control Device>

The control device 50 controls the excavator 1. The control device 50 includes a computer system. The control device 50 has an energization signal acquisition unit 63, an energized state determination unit 64, a circuit signal acquisition unit 51, a circuit state determination unit 52, a circuit control unit 58, a start signal acquisition unit 53, a start operation determination unit 54, a drive instruction processing determination unit 61, a lock signal acquisition unit 55, a lock state determination unit 56, a holding unit 57, a drive instruction unit 59, and a lock instruction unit 60.

The energization signal acquisition unit 63 acquires an energization signal which is generated by the key switch 34.

The energized state determination unit 64 determines whether or not an energized state exists on the basis of the energization signal acquired by the energization signal acquisition unit 63. When the key switch 34 is in a key ON state or a start state, the energized state determination unit 64 determines the state to be an energized state. When the key switch 34 is in a key OFF state, the energized state determination unit 64 determines the state to be a non-energized state. When the key switch 34 is in an energized state, driving of the electric motor 32 is allowed. When the key switch 34 is in a non-energized state, driving of the electric motor 32 is not allowed.

The circuit signal acquisition unit 51 acquires a circuit signal that is outputted from the supply circuit 33. The circuit signal is a signal which is used to determine whether the supply circuit 33 is in a state of being capable of supplying power to the electric motor 32.

Figure 3:
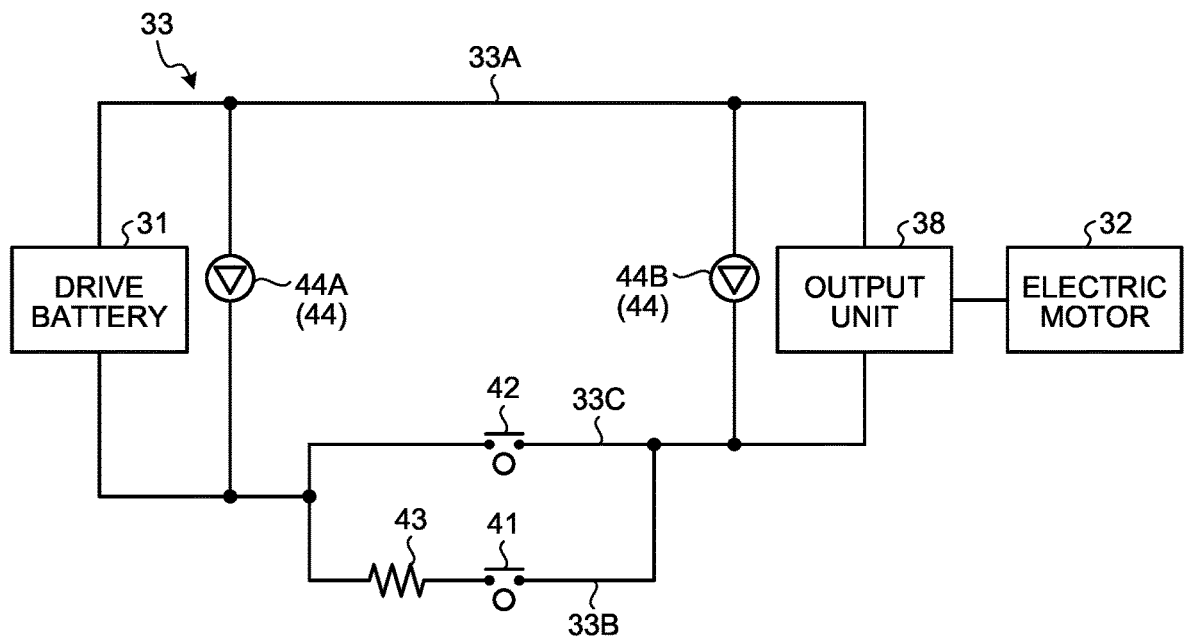
FIG. 3 is a schematic diagram illustrating a supply circuit according to the present embodiment.

FIG. 3 is a schematic diagram illustrating a supply circuit 33 according to the present embodiment. The supply circuit 33 is connected to the drive battery 31. The supply circuit 33 has an output unit 38 that is connected to the electric motor 32. The supply circuit 33 includes a loop circuit 33A that connects the electric motor 32 to the output unit 38; a contactor circuit 33B that includes a contactor 41 and a resistor 43; and a contactor circuit 33C that includes a contactor 42. The contactor circuit 33B and the contactor circuit 33C are parallel to one another.

When transitioning from a state of being incapable of supplying power to the electric motor 32 to a state of being capable of supplying power thereto, the supply circuit 33 prevents a large current from being supplied rapidly to the output unit 38. When the key switch 34 is in a key OFF state, the contactor 41 and contactor 42 of the supply circuit 33 are each in an OFF state. When the key switch 34 changes from a key OFF state to a key ON state, the contactor 42 of the contactor circuit 33C enters an OFF state and the contactor 41 of the contactor circuit 33B enters an ON state due to a circuit control instruction from the circuit control unit 58. The contactor circuit 33B includes the resistor 43. Because the contactor 41 of the contactor circuit 33B enters an ON state, the current to the output unit 38 flows via the resistor 43, and thus a large current is prevented from being supplied rapidly. The output unit 38 is a device for converting the DC power from the drive battery 31 to AC power suitable for driving the electric motor 32, for example an inverter.

The supply circuit 33 includes a voltage sensor 44. The voltage sensor 44 includes a voltage sensor 44A that detects an input voltage representing the voltage of the loop circuit 33A on the input side of the contactor circuit 33B and the contactor circuit 33C, and a voltage sensor 44B that detects an output voltage representing the voltage of the loop circuit 33A on the output side of the contactor circuit 33B and the contactor circuit 33C. When the difference between the input voltage and the output voltage is equal to or smaller than a prescribed value, the contactor 41 of the contactor circuit 33B changes from an ON state to an OFF state and the contactor 42 of the contactor circuit 33C changes from an OFF state to an ON state due to a circuit control instruction from the circuit control unit 58. In this state, power is supplied from the drive battery 31 to the output unit 38 and to the electric motor 32 without passing via the resistor 43.

The circuit state determination unit 52 determines whether or not the supply circuit 33 is in a state of being capable of supplying power to the electric motor 32. When predetermined conditions are met for the supply circuit 33, a circuit signal indicating a state where the supply circuit 33 is capable of supplying power to the electric motor 32 is outputted from the supply circuit 33 to the control device 50. When predetermined conditions are not met for the supply circuit 33, a circuit signal indicating a state where the supply circuit 33 is incapable of supplying power to the electric motor 32 is outputted from the supply circuit 33 to the control device 50. The predetermined conditions include the condition that the difference between the input voltage and output voltage be equal to or smaller than the prescribed value. Note that the predetermined conditions may also include the condition that the contactor 41 be in an OFF state and that the contactor 42 be in an ON state.

The circuit state determination unit 52 determines whether or not the supply circuit 33 is in a state of being capable of supplying power to the electric motor 32 on the basis of the circuit signal acquired by the circuit signal acquisition unit 51 and the circuit control instruction outputted from the circuit control unit 58. The circuit state determination unit 52 determines the circuit state of the supply circuit 33 on the basis of the circuit signal acquired from the supply circuit 33 via the circuit signal acquisition unit 51 and the circuit control signal acquired from the circuit control unit 58, and outputs the circuit state determination results to the drive instruction processing determination unit 61. Note that the configuration may be such that, when predetermined conditions are not met for the supply circuit 33, a circuit signal indicating that the supply circuit 33 is capable of supplying power to the electric motor 32 is not outputted from the supply circuit 33 to the control device 50.

The circuit control unit 58 first acquires the energization signal generated by the key switch 34 and outputs the circuit control instruction to control the supply circuit 33. After acquiring the energization signal, the circuit control unit 58 acquires the circuit state determination from the circuit state determination unit 52 and outputs the circuit control instruction to the supply circuit 33. The circuit control instruction is outputted to the supply circuit 33 and the circuit state determination unit 52. The circuit control instruction includes instructions regarding the switching between ON states and OFF states of the contactors, and the sequential order of such states.

The start signal acquisition unit 53 acquires the start signal that is outputted from the key switch 34. In a case where the key switch 34 is operated to a start state while the lock lever 13 is in a lock state, the start signal generated in the key switch 34 is supplied to the control device 50 via the switch element 36. The start signal acquisition unit 53 acquires the start signal in a case where the key switch 34 is operated to a start state while the lock lever 13 is in a lock state.

The start operation determination unit 54 determines whether or not the start signal of the key switch 34 is in a generation state on the basis of the start signal acquired by the start signal acquisition unit 53.

The start operation determination unit 54 acquires, via the start signal acquisition unit, a start signal which is generated when the key switch 34 is in a start state and when the switch element 36 is in an ON state. Thereafter, the time point at which the key switch 34 changes from a start state to a key ON state is assumed to be a first time point t1.

The drive instruction processing determination unit 61 includes a drive start processing determination unit 61B, a drive stop processing determination unit 61A, and a drive instruction decision unit 61C.

The drive start processing determination unit 61B receives inputs, namely, a circuit state determination result, which is a determination result of the circuit state determination unit 52, a start operation determination result, which is a determination result of the start operation determination unit 54, and a lock state determination result, which is a determination result of the lock state determination unit 56. The drive start processing determination unit 61B outputs, to the drive instruction decision unit 61C, a drive start processing determination result, which is a determination result regarding whether driving of the electric motor 32 may be started, on the basis of the circuit state determination result, the start operation determination result, and the lock state determination result.

When the start operation determination result of the start operation determination unit 54 is a generation state, the holding unit 57 stores the fact that the state is a generation state. Even when the key switch 34 changes from a start state to a key ON state at first time point t1, the holding unit 57 determines that the start signal is in a generation state.

Meanwhile, in a case where the lock state determination result, which is the determination result of the lock state determination unit 56, is a lock release state, even when the stored start operation determination result of the holding unit 57 is a generation state, the holding unit 57 resets the stored result and stores the fact that the state is not a generation state. In other words, even when the fact that a start signal has been generated at or before first time point t1 is acquired, in a case where the lock lever 13 transitions from a lock state to a lock release state at or after first time point t1, the holding unit 57 regards the start signal as not having been generated at or before the time point of the transition to the lock release state.

The drive start processing determination unit 61B determines that drive start processing may be performed when both of the following conditions are met: the circuit state determination result, which is the determination result of the circuit state determination unit 52, is that the supply circuit 33 is in a supply-capable state, and the determination result of the holding unit 57 is that a generation state exists.

The drive stop processing determination unit 61A determines that drive stop processing may be started when either of the following conditions is met: the supply circuit 33 is in a supply-incapable state according to the circuit state determination result of the circuit state determination unit 52, and the determination result of the energized state determination unit 64 is that a non-energized state exists.

The drive instruction decision unit 61C normally maintains the state of drive instructions (the drive state/the stop state). However, when drive start is determined by the drive start processing determination unit 61B, there is a transition from a stop state to a drive state. Furthermore, when drive stop is determined by the drive stop processing determination unit 61A, there is a transition from a drive state to a stop state.

The drive instruction unit 59 outputs a drive instruction to the electric motor 32 on the basis of the determination result of the drive instruction decision unit 61C. That is, the electric motor 32 is driven when the determination result of the drive instruction decision unit 61C is that a drive state exists. The electric motor 32 is stopped when the determination result of the drive instruction decision unit 61C is that a stop state exists.

As mentioned earlier, in a case where predetermined conditions are not met for the supply circuit 33, the supply circuit 33 is in a state of being incapable of supplying power to the electric motor 32. In a case where predetermined conditions are met for the supply circuit 33, the supply circuit 33 is in a state of being capable of supplying power to the electric motor 32. The supply circuit 33 transitions from a state of being incapable of supplying power to a supply-capable state. In a case where, at a second time point t2 after first time point t1, the supply circuit 33 transitions from a state of being incapable of supplying power to a supply-capable state, the holding unit 57 determines that the start signal is in a generation state even when a start signal has not been acquired by the start signal acquisition unit 53 between first time point t1 and second time point t2.

The lock signal acquisition unit 55 acquires a lock signal from the lock lever switch 35. When the lock lever 13 is in a lock state, the lock signal generated by the lock lever switch 35 is outputted to the control device 50. The lock signal acquisition unit 55 acquires a lock signal in a case where the lock lever 13 is in a lock state.

The lock state determination unit 56 determines whether or not the lock lever 13 is in a lock state. The lock state determination unit 56 determines whether or not the lock lever 13 is in a lock state on the basis of the lock signal acquired by the lock signal acquisition unit 55.

The drive instruction unit 59 outputs a drive instruction, which has been decided by the drive instruction processing determination unit 61, to the electric motor 32. In a case where the start signal in the holding unit 57 is in a generation state, when the supply circuit 33 transitions from a state of being incapable of supplying power to a supply-capable state, the outputting of the drive instruction from the drive instruction unit 59 to the electric motor 32 is started. In a state where the supply circuit 33 transitions from a state of being incapable of supplying power to a supply-capable state, because the drive instruction is outputted to the electric motor 32, the electric motor 32 is capable of performing driving on the basis of the power supplied from the supply circuit 33.

The lock instruction unit 60 outputs a lock signal to the lock solenoid 24 on the basis of the lock state determination result of the lock state determination unit 56.

The drive instruction unit 59 outputs a drive instruction to the electric motor 32 after the elapse of second time point t2 when the start signal is in a generation state in the holding unit 57. It is determined that the start signal is in a generation state even when a start signal is not acquired by the start signal acquisition unit 53 between first time point t1 and second time point t2. The electric motor 32 is accordingly capable of starting even when a single step operation is carried out.

A single step operation refers to an operation in which the key switch 34 is changed from a key OFF state to a start state, and then to a key ON state in a short time. When a single step operation is carried out in a case where the prime mover of the excavator 1 is the electric motor 32, the electric motor 32 will likely not start.

For example, in a case where the power outputted from the drive battery 31 is supplied to the electric motor 32 via the supply circuit 33, when the key switch 34 changes from a key OFF state to a key ON state, the supply circuit 33 transitions from a state of being incapable of supplying power to the electric motor 32 to a state of being capable of supplying power thereto. However, it takes time to make the transition because the circuit state must be determined on the basis of the circuit signal. The key switch 34 is made to change for a short time from a key OFF state to a start state, and returns to a key ON state when the operator removes their hand for a short time. Hence, the circuit state is determined, and before a supply-capable state is determined, the start signal, once generated, enters a non-generation state.

Upon carrying out a single step operation, when the key switch 34 returns from a start state to a key ON state at first time point t1, the first time point t1 will likely precede second time point t2 at which the supply circuit 33 transitions to a state of being capable of supplying power. As a result, even when the supply circuit 33 transitions to a state of being capable of supplying power at second time point t2, because the start signal of the key switch 34 is not supplied to the electric motor 32, the electric motor 32 does not start.

According to the present embodiment, a start signal which is generated at or before first time point t1 is stored in the holding unit 57. When a start signal is stored in the holding unit 57, the start signal is determined as being in a generation state. That is, even when the start signal is generated at or before first time point t1 and is not continuously generated at second time point t2, as long as a start signal is stored in the holding unit 57 at second time point t2, the start signal is determined as being in a generation state at second time point t2. In a state where the start signal is in a generation state and the lock lever 13 is in a lock state, the drive instruction unit 59 outputs a drive instruction to the electric motor 32 after the elapse of second time point t2 at which the supply circuit 33 has transitioned from a state of being incapable of supplying power to a supply-capable state. Thus, a single step operation is carried out at or before first time point t1, and even when, prior to the elapse of second time point t2, the key switch 34 is returned from a start state to a key ON state, the electric motor 32 is capable of performing driving on the basis of the power supplied from the drive battery 31 and the supply circuit 33.

<Excavator Startup Processing>

The operator places the lock lever 13 in a lock state in order to start up the electrical system 30 of the excavator 1. The key switch 34 is in a key OFF state. With the lock state of the lock lever 13 maintained, the operator inserts a key into the key cylinder of the key switch 34 and turns the key. The key switch 34 thus changes from a key OFF state to a key ON state.

When the key switch 34 changes to a key ON state, power is supplied from the auxiliary battery 37 to the electrical system 30 which includes electrical equipment.

As a result of the key switch 34 changing from a key OFF state to a key ON state, the control device 50 uses circuit control instructions to place the contactor 41 of the contactor circuit 33B in the supply circuit 33 in an ON state and then place the contactor 41 in an OFF state and the contactor 42 of the contactor circuit 33C in an ON state, as described with reference to FIG. 3.

Figure 4:
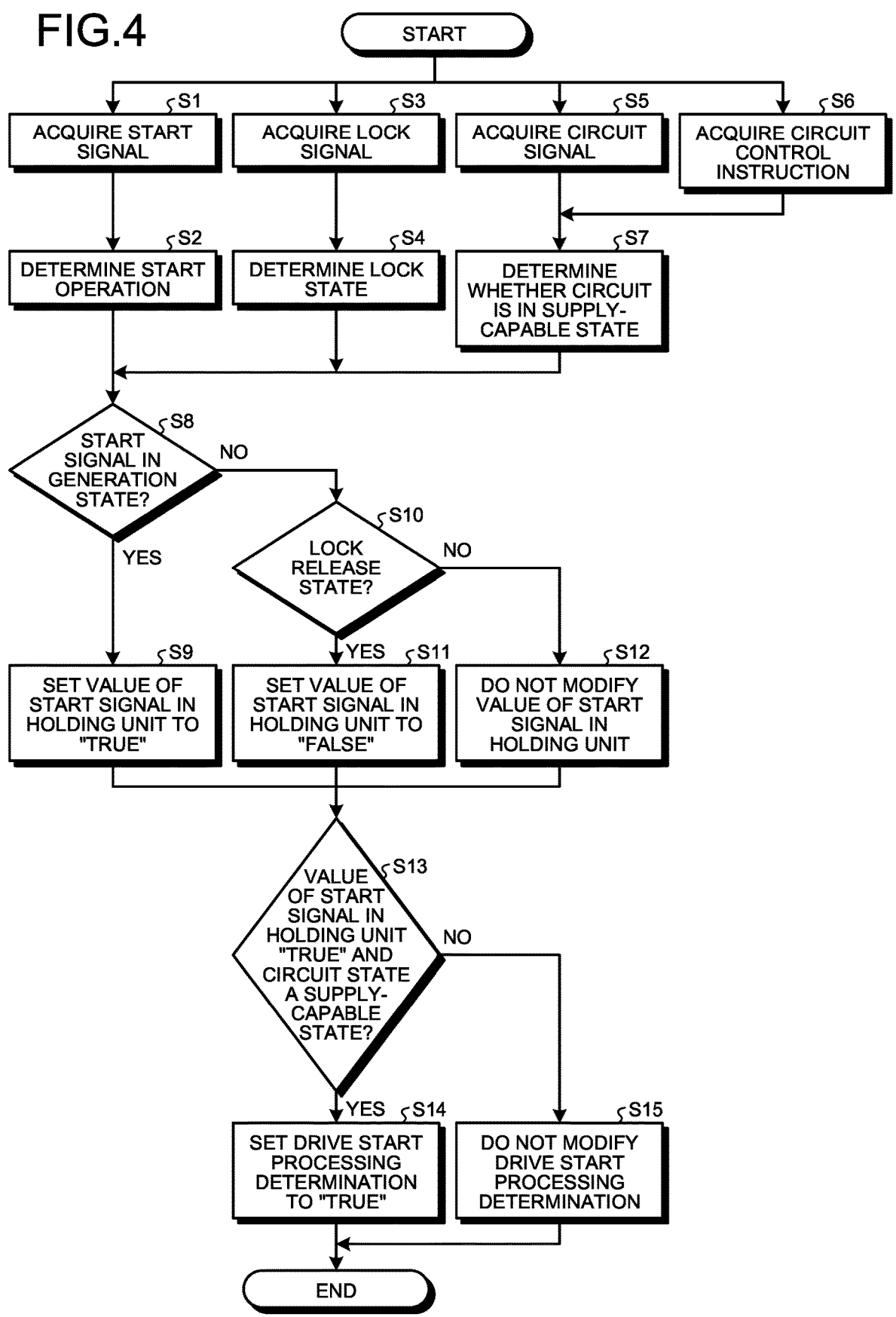
FIG. 4 is a flowchart illustrating work vehicle startup processing according to the present embodiment.

FIG. 4 is a flowchart illustrating a drive start processing determination of the electric motor 32 in the startup processing of the electrical system 30 of the excavator 1 according to the present embodiment. The operator changes the position of the key in the key switch 34 to the "start" position in order to start the electric motor 32 of the excavator 1. The key switch 34 thus changes to a start state.

When the key switch 34 changes to a start state, a start signal is generated in the key switch 34. In a case where the lock lever 13 is in a lock state, the switch element 36 is in an ON state. The start signal acquisition unit 53 acquires the generated start signal via the switch element 36 (step S1).

The start operation determination unit 54 determines whether or not a start operation is to be performed (step S2).

The lock lever 13 is in a lock state. The lock signal acquisition unit 55 acquires a lock signal from the lock lever switch 35 (step S3).

The lock state determination unit 56 determines whether or not a lock state exists (step S4).

The circuit signal acquisition unit 51 acquires a circuit signal from the supply circuit 33 (step S5).

The circuit state determination unit 52 acquires a circuit control instruction from the circuit control unit 58 (step S6). The circuit state determination unit 52 determines whether or not the supply circuit 33 is in a state of being capable of supplying power (step S7).

Note that the sequential order of the processing of steps S1 to S7 is optional.

The holding unit 57 stores the start signal acquired by the start signal acquisition unit 53.

The start operation determination unit 54 determines whether or not the start signal is in a generation state (step S8). When a start signal is stored in the holding unit 57, the holding unit 57 determines that the start signal is in a generation state.

In a case where it is determined in step S8 that the start signal is in a generation state (step S8: Yes), the drive instruction processing determination unit 61 sets the value of the start signal in the holding unit 57 to TRUE (step S9).

In a case where it is determined in step S8 that the start signal is not in a generation state (step S8: No), the lock state determination unit 56 determines whether or not the lock lever 13 is in a lock release state on the basis of the lock signal acquired by the lock signal acquisition unit 55 (step S10).

In a case where it is determined in step S10 that a lock release state exists (step S10: Yes), the drive instruction processing determination unit 61 sets the value of the start signal in the holding unit 57 to FALSE (step S11).

In a case where it is determined in step S10 that a lock release state does not exist (step S10: No), the drive instruction processing determination unit 61 does not modify the value of the start signal in the holding unit 57 (step S12).

The drive instruction processing determination unit 61 determines whether or not the value of the start signal in the holding unit 57 is TRUE and whether or not the supply circuit 33 is in a state of being capable of supplying power (step S13).

In a case where it is determined in step S13 that the value of the start signal in the holding unit 57 is TRUE and that the supply circuit 33 is in a state of being capable of supplying power (step S13: Yes), the drive instruction processing determination unit 61 sets the drive start processing determination to TRUE (step S14).

The drive instruction unit 59 outputs a drive instruction to the electric motor 32.

In a case where it is determined in step S13 that the value of the start signal in the holding unit 57 is TRUE and that the supply circuit 33 is not in a state of being capable of supplying power (step S13: No), the drive instruction processing determination unit 61 does not modify the drive start processing determination (step S15).

<Computer System>

Figure 5:
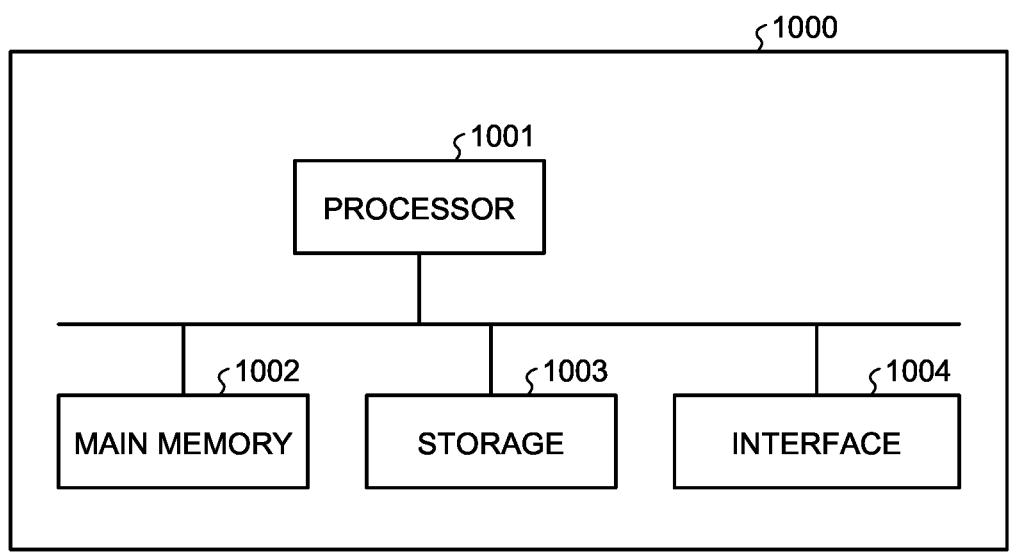
FIG. 5 is a block diagram illustrating an example of a computer system according to the present embodiment.

FIG. 5 is a block diagram illustrating an example of a computer system 1000 according to the present embodiment. The foregoing control device 50 includes the computer system 1000. The computer system 1000 has a processor 1001 such as a central processing unit (CPU), a main memory 1002 that includes a nonvolatile memory such as a read-only memory (ROM) and a volatile memory such as a random-access memory (RAM), a storage 1003, and an interface 1004 that includes I/O circuitry. The functions of the foregoing control device 50 are stored in the storage 1003 as a program. The processor 1001 reads the program from the storage 1003, decompresses same in the main memory 1002, and executes the foregoing processing according to the program. Note that the program may also be distributed to the computer system 1000 via a network.

The program is capable, according to the foregoing embodiment, of outputting a drive instruction to the electric motor 32 on the basis of the generation state of the start signal of the key switch 34, the lock state of the lock lever, and the circuit state of the supply circuit.

Advantageous Effects

As described hereinabove, according to the present embodiment, when the start signal is in a generation state and the lock lever 13 is in a lock state, a drive instruction is outputted to the electric motor 32 at the time the supply circuit 33 transitions from a state of being incapable of supplying power to a supply-capable state. The start signal being in a generation state includes the fact that the start signal is stored in the holding unit 57.

Because the key switch 34 enters a start state, a start signal is generated, the key switch 34 is returned from a start state to a key ON state at first time point t1, and the supply circuit 33 transitions from a state of being incapable of supplying power to a supply-capable state at second time point t2.

Even when, through a single step operation, the key switch 34 is returned from a start state to a key ON state at first time point t1 before second time point t2, the fact that the start signal is in a generation state is stored in the holding unit 57 at second time point t2. Hence, the drive instruction unit 59 is capable of outputting a drive instruction to the electric motor 32 in a state where power can be supplied from the supply circuit 33 to the electric motor 32. Therefore, even when a single step operation is carried out, the control device 50 is capable of starting the electric motor 32.

The start signal generated at or before first time point t1 is stored in the holding unit 57. When a start signal is stored in the holding unit 57, the holding unit 57 determines that the start signal is in a generation state. Even when the start signal is generated at or before first time point t1 and is not generated at second time point t2, as long as a start signal is stored in the holding unit 57 at second time point t2, the start signal is determined as being in a generation state at second time point t2. The drive instruction unit 59 outputs a drive instruction to the electric motor 32 after the elapse of second time point t2 in a state where the start signal is in a generation state and the lock lever 13 is in a lock state. Thus, a single step operation is carried out, and even when, at first time point t1 prior to the elapse of second time point t2, the key switch 34 is returned from a start state to a key ON state, the electric motor 32 is capable of performing driving on the basis of the power supplied from the drive battery 31 and the supply circuit 33.

FIG. 6 is a timing chart illustrating start processing of the excavator 1 according to the present embodiment. FIG. 6(A) is a timing chart for when a single step operation is not carried out. The key switch 34 enters a start state by passing from an OFF state to an ON state, and subsequently enters a start state. The start signal is generated when the key switch 34 is in a start state. When the start signal is in a generation state and the lock lever 13 is in a lock state, the supply circuit 33 is in a state of being capable of supplying power, and hence a drive instruction is outputted to the electric motor 32.

FIG. 6(B) is a timing chart for when a single step operation is carried out. When the key switch 34 is in a start state, the start signal is in a generation state. When the start signal is in the generation state, the lock lever 13 is in a lock state. Upon carrying out a single step operation, when the start signal is in a generation state, the supply circuit 33 is in a state of being incapable of supplying power, and after the key switch 34 changes from a start state to an ON state, the supply circuit 33 enters a state of being capable of supplying power. In a case where the start signal is in a non-generation state and the supply circuit 33 is in a state of being capable of supplying power, the start signal is conventionally not supplied to the electric motor 32, and the electric motor 32 does not start. In the present embodiment, the value in the holding unit 57 indicates that the start signal is in a generation state. For this reason, the drive instruction processing determination unit 61 is capable, on the basis of the value in the holding unit 57, of outputting a drive instruction to the electric motor 32 after the supply circuit 33 enters a state of being capable of supplying power. The electric motor 32 is accordingly capable of starting even when a single step operation is carried out.

FIG. 6(C) is a timing chart for when a single step operation is carried out. FIG. 6(C) illustrates an example in which the lock lever 13 is in a lock release state before the supply circuit 33 enters a state of being capable of supplying power. In the example illustrated in FIG. 6(C), even when the value in the holding unit 57 indicates that the start signal is in a generation state, because the lock lever 13 is in a lock release state when the supply circuit 33 is in a state of being capable of supplying power, the start signal in the holding unit 57 is no longer in a generation state, and therefore a drive instruction is not outputted to the electric motor 32 and the electric motor 32 does not start. As illustrated in this example, even in the case of a single step operation, safety is guaranteed in that the electric motor 32 is not started when the lock is in a release state.

OTHER EMBODIMENTS

In the foregoing embodiment, when a start signal generated at or before first time point t1 is stored in the holding unit 57, when the start signal is stored in the holding unit 57 at second time point t2, the start signal is assumed to be in a generation state at second time point t2. The start signal does not need to be stored in the holding unit 57. The start signal acquisition unit 53 acquires a start signal generated at or before first time point t1. The start operation determination unit 54 may determine that the start signal is in a generation state until a prescribed time period has elapsed since first time point t1. The time period that has elapsed since first time point t1 is measured by the circuit control unit 58. In a case where second time point t2, at which the supply circuit 33 transitions from a state of being incapable of supplying power to a supply-capable state is already known, the start operation determination unit 54 may also determine that the start signal is in a generation state until a third time point t3 later than second time point t2 has elapsed. In other words, the drive instruction unit 59 may also output a drive instruction at third time point t3 after the prescribed time period has elapsed since the start signal was generated at or before first time point t1.

In the foregoing embodiment, the lock lever 13 may be a safe operation unit, and a unit that is driven by a lock instruction may operate through the operation of the lock lever 13 or may limit the operation of an actuator which is driven through the operation of the electric motor 32. For example, a parking brake may be used in place of the lock lever 13, and a unit that is driven by a lock instruction may be a parking brake. For example, a unit that is driven by a lock instruction may be a unit such as a clutch.

In the foregoing embodiment, it is assumed that the excavator 1 is supplied with power from the drive battery 31. The excavator 1 may also be supplied with power from an external power supply via a power cable.

In the foregoing embodiment, although the description is provided based on the assumption that the key switch 34 is capable of generating a start signal due to a key being inserted into the key cylinder and turned, the present invention is not limited to or by this configuration. For example, the equipment carried by the operator may be a device that contains an electronic chip and that determines that a start signal has been generated due to a predetermined operation by the operator within a certain range of the vehicle.

In the foregoing embodiment, the excavator 1 does not need to have a canopy specification. The excavator 1 may also have a cabin specification in which the space around the operator seat 6 is closed.

In the foregoing embodiment, the work vehicle 1 does not need to be an excavator 1. The work vehicle 1 may be a wheel loader, a bulldozer, or a fork lift truck, for example.

In the foregoing embodiment, the work vehicle 1 may instead be a work vehicle in which the working equipment 5, the traveling body 2, and the swing body 3 are driven by an electric actuator instead of the hydraulic system 20. In this case, the power for driving the electric actuator is supplied from the drive battery 31. The work vehicle is an electrically-driven work vehicle.

In the foregoing embodiment, the work vehicle 1 may also be configured such that, instead of the pilot pressure for moving the spool of the main valve 22, the spool is made to move through electrical driving. In this case, a lock instruction of the lock lever 13 may render the working equipment cylinder incapable of driving by invalidating an instruction to move the spool.

In the foregoing embodiment, each of the functions of the control device 50 of the work vehicle 1 may also be distributed across a plurality of equipment. For example, some of the functions may also be provided in a display control unit (not illustrated) which is provided to the display device 9.

REFERENCE SIGNS LIST

1 Excavator (work vehicle)
2 Traveling body
3 Swing body
4 Blade
5 Working equipment
5A Boom
5B Arm
5C Bucket
6 Operator seat
7 Working equipment lever
8 Travel lever
9 Display device
10 Support arm
11 Support
12 Canopy
13 Lock lever
20 Hydraulic system
21 Hydraulic pump
22 Main valve
23 Pilot valve 24 Lock solenoid
25 Pilot source pressure generation unit
26 Working equipment cylinder
26A Boom cylinder
26B Arm cylinder
26C Bucket cylinder
30 Electrical system
31 Drive battery
32 Electric motor
33 Supply circuit
33A Loop circuit
33B Contactor circuit
33C Contactor circuit
34 Key switch (start switch)
35 Lock lever switch
36 Switch element
37 Auxiliary machinery battery
38 Output unit
41 Contactor
42 Contactor
43 Resistor
44 Voltage sensor
44A Voltage sensor
44B Voltage sensor
50 Control device
51 Circuit signal acquisition unit
52 Circuit state determination unit
53 Start signal acquisition unit
54 Start operation determination unit
55 Lock signal acquisition unit
56 Lock state determination unit
57 Holding unit
58 Circuit control unit
59 Drive instruction unit
60 Lock instruction unit
61 Drive instruction processing determination unit
61A Drive stop processing determination unit
61B Drive start processing determination unit
61C Drive instruction decision unit
63 Energization signal acquisition unit
64 Energized state determination unit

The invention claimed is:

1. A control device of a work vehicle, the control device comprising:
a processor configured with the following components:
a start operation determination unit that determines whether or not a generation state exists in which a start signal of a start switch for starting an electric motor has been generated;
a start signal acquisition unit that acquires the start signal generated at or before a first time point and acquires the start signal in a case where the start switch is operated to a start state while a safe operation unit is in a lock state, which is a non-drivable state;
a lock state determination unit that determines whether or not the safe operation unit is in the lock state;
a circuit state determination unit that determines whether or not a supply circuit is in a state of being capable of supplying power to the electric motor; and
a drive instruction unit that, in both the generation state and the lock state, does not output a drive instruction to the electric motor when the supply circuit is determined to be in a state of being incapable of supplying the power, and outputs the drive instruction to the electric motor when the supply circuit transitions from a state of being incapable of supplying the power to a supply-capable state.

2. The control device of a work vehicle according to claim 1, the control device comprising:
the processor further configured with the following components:
a holding unit that stores the acquired start signal acquired by the start signal acquisition unit and which determines that the generation state exists until a prescribed time period elapses since the first time point.

3. A control device of a work vehicle, the control device comprising:
a processor configured with the following components:
a start operation determination unit that determines whether or not a generation state exists in which a start signal of a start switch for starting an electric motor has been generated;
a lock state determination unit that determines whether or not a safe operation unit is in a lock state;
a circuit state determination unit that determines whether or not a supply circuit is in a state of being capable of supplying power to the electric motor;
a drive instruction unit that, in both the generation state and the lock state, does not output a drive instruction to the electric motor when the supply circuit is determined to be in a state of being incapable of supplying the power, and outputs the drive instruction to the electric motor when the supply circuit transitions from a state of being incapable of supplying the power to a supply-capable state, and
a holding unit which determines that the generation state exists even when the start signal has not been acquired between a first time point and a second time point at which a transition is made to the supply-capable state.

4. The control device of the work vehicle according to claim 1,
wherein the supply circuit supplies power outputted from a drive battery to the electric motor.

5. A work vehicle comprising: the control device of a work vehicle according to claim 1; a vehicle body that supports a blade; and a blade control device,
the blade control device comprising:
the processor configured to perform the following:
determining whether or not a generation state exists in which a start signal of a start switch for starting an electric motor has been generated;
determining whether or not a safe operation unit is in a lock state;
determining whether or not a supply circuit is in a state of being capable of supplying power to the electric motor; and
in both the generation state and the lock state, does not output a drive instruction to the electric motor when the supply circuit is determined to be in a state of being incapable of supplying the power, and outputs the drive instruction to the electric motor when the supply circuit transitions from a state of being incapable of supplying the power to a supply-capable state.

6. A control device of a work vehicle, the control device comprising:
a processor having the following components and configured to perform the following:

determining whether or not a generation state exists in which a start signal of a start switch for starting an electric motor has been generated;

determining whether or not a safe operation unit is in a lock state;

determining whether or not a supply circuit is in a state of being capable of supplying power to the electric motor;

in both the generation state and the lock state, outputting a drive instruction to the electric motor when the supply circuit transitions from a state of being incapable of supplying the power to a supply-capable state;

a start signal acquisition unit that acquires the start signal generated at or before a first time point; and a holding unit that stores the acquired start signal acquired by the start signal acquisition unit;

wherein, when the start signal is stored in the holding unit, the holding unit determines that the generation state exists; and when the circuit state determination unit processor determines that a state of being capable of supplying power does not exist and the lock state determination unit determines that a lock release state exists, the holding unit determines that the stored start signal stored in the holding unit does not exist.

* * * * *